(12) United States Patent
Kim et al.

(10) Patent No.: US 12,087,967 B2
(45) Date of Patent: Sep. 10, 2024

(54) FUNCTIONAL SEPARATOR, MANUFACTURING METHOD THEREFOR, AND LITHIUM SECONDARY BATTERY COMPRISING SAME

(71) Applicant: LG CHEM, LTD., Seoul (KR)

(72) Inventors: Kihyun Kim, Daejeon (KR); Seungbo Yang, Daejeon (KR); Jangsoo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 798 days.

(21) Appl. No.: 17/052,918

(22) PCT Filed: Oct. 25, 2019

(86) PCT No.: PCT/KR2019/014189
§ 371 (c)(1),
(2) Date: Nov. 4, 2020

(87) PCT Pub. No.: WO2020/085859
PCT Pub. Date: Apr. 30, 2020

(65) Prior Publication Data
US 2021/0242534 A1    Aug. 5, 2021

(30) Foreign Application Priority Data

Oct. 26, 2018  (KR) ........................ 10-2018-0129174
Oct. 24, 2019  (KR) ........................ 10-2019-0132731

(51) Int. Cl.
*H01M 50/431* (2021.01)
*H01M 10/0525* (2010.01)
(Continued)

(52) U.S. Cl.
CPC ..... *H01M 50/431* (2021.01); *H01M 10/0525* (2013.01); *H01M 50/403* (2021.01); *H01M 50/443* (2021.01); *H01M 50/449* (2021.01)

(58) Field of Classification Search
CPC ............. H01M 50/457; H01M 50/431; H01M 50/403; H01M 50/443; H01M 10/0525;
(Continued)

(56) References Cited

U.S. PATENT DOCUMENTS

| | | | |
|---|---|---|---|
| 2012/0026643 A1* | 2/2012 | Yu | H01G 11/46 977/932 |
| 2018/0062137 A1 | 3/2018 | Kong et al. | |

(Continued)

FOREIGN PATENT DOCUMENTS

| | | |
|---|---|---|
| CN | 105140447 A | 12/2015 |
| CN | 105280867 A | 1/2016 |

(Continued)

OTHER PUBLICATIONS

Extended European Search Report for European Application No. 19876010.0, dated Jun. 18, 2021.
(Continued)

*Primary Examiner* — Zhongqing Wei
(74) *Attorney, Agent, or Firm* — Birch, Stewart, Kolasch & Birch, LLP

(57) ABSTRACT

A functional separator capable of improving the capacity and lifetime of a battery by coating a material capable of reducing lithium polysulfide on a separator surface in order to resolve the problems caused by leaching of lithium polysulfide, a preparation method thereof and a lithium secondary battery including the same. The functional separator includes a base separator; a conductive carbon layer on (Continued)

the surface of the base separator; and a metal oxide formed on at least one of an interior and the surface of the conductive carbon layer.

8 Claims, 5 Drawing Sheets

(51) Int. Cl.
*H01M 50/403* (2021.01)
*H01M 50/443* (2021.01)
*H01M 50/449* (2021.01)

(58) Field of Classification Search
CPC ........... H01M 10/4235; H01M 50/449; H01M 10/052; Y02E 60/10
See application file for complete search history.

(56) References Cited

U.S. PATENT DOCUMENTS

| | | | |
|---|---|---|---|
| 2018/0062142 A1* | 3/2018 | Kong | B32B 9/04 |
| 2018/0198156 A1 | 7/2018 | Lee et al. | |
| 2020/0328394 A1 | 10/2020 | Song et al. | |

FOREIGN PATENT DOCUMENTS

| | | | |
|---|---|---|---|
| CN | 105489818 | A | 4/2016 |
| CN | 105977434 | A | 9/2016 |
| CN | 106848156 | A | 6/2017 |
| CN | 106935773 | A | 7/2017 |
| CN | 107275551 | A | 10/2017 |
| CN | 107785523 | A | 3/2018 |
| CN | 107785524 | A | 3/2018 |
| EP | 3 460 875 | A1 | 3/2019 |
| JP | 2017-224554 | A | 12/2017 |
| JP | 2018-37407 | A | 3/2018 |
| JP | 2019-517113 | A | 6/2019 |
| KR | 10-0240743 | B1 | 1/2000 |
| KR | 10-2010-0081742 | A | 7/2010 |
| KR | 10-1455943 | B1 | 11/2014 |
| KR | 10-2015-0099648 | A | 9/2015 |
| KR | 10-2016-0104769 | A | 9/2016 |
| KR | 10-2017-0090294 | A | 8/2017 |
| KR | 10-2017-0093606 | A | 8/2017 |
| KR | 10-2018-0076219 | A | 7/2018 |
| WO | WO 2018/034501 | A1 | 2/2018 |

OTHER PUBLICATIONS

Yao et al., "Improved lithium-sulfur batteries with a conductive coating on the separator to prevent the accumulation of inactive S-related species at the cathode-separator interface", Energy & Environmental Science, vol. 7, No. 10, 2014, pp. 3381-3390.

International Search Report issued in PCT/KR2019/014189 (PCT/ISA/210), dated Feb. 10, 2020.

Tan et al., "Lightweight Reduced Graphene Oxide@MoS2 Interlayer as Polysulfide Barrier for High-Performance Lithium-Sulfur Batteries", ACS Applied Materials and Interfaces, vol. 10, No. 4, pp. 3707-3713 (Total No. pp. 1-27).

Huang et al., "Review on Advanced Functional Separators for Lithium-Sulfur Batteries," Acta Chimica Sinica, vol. 75, 2017, pp. 173-188, with English abstract.

Xiao el al., "A Lightweight TiO2/Graphene Inlerlayer, Applied as a Highly Effective Polysulfide Absorbent fox Fast, Long-Life Lithium-Sulfur Batteries," Advanced Materials, 2015, pp. 1-8.

* cited by examiner

[Figure 1]
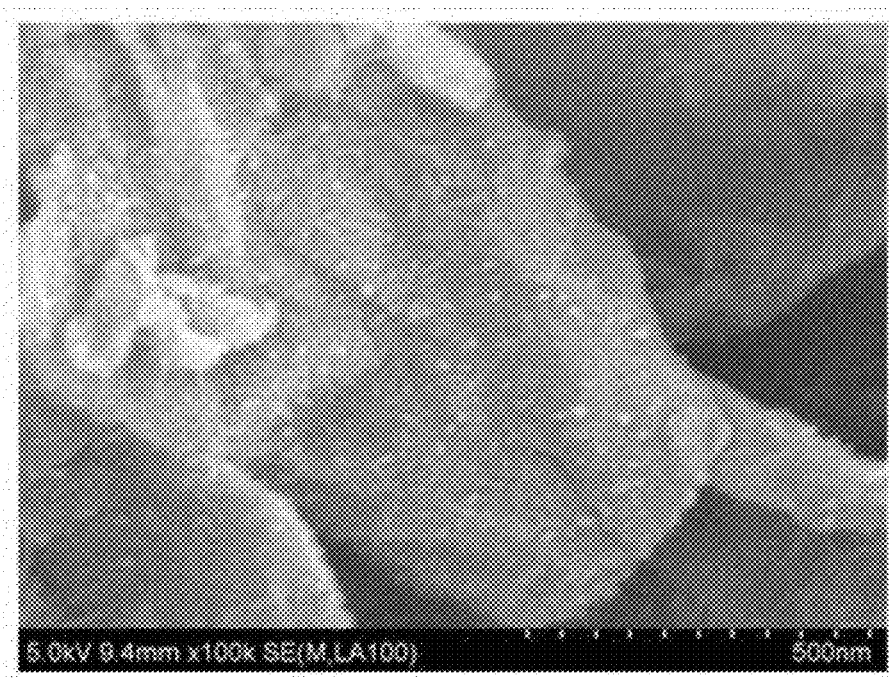
[Figure 2]
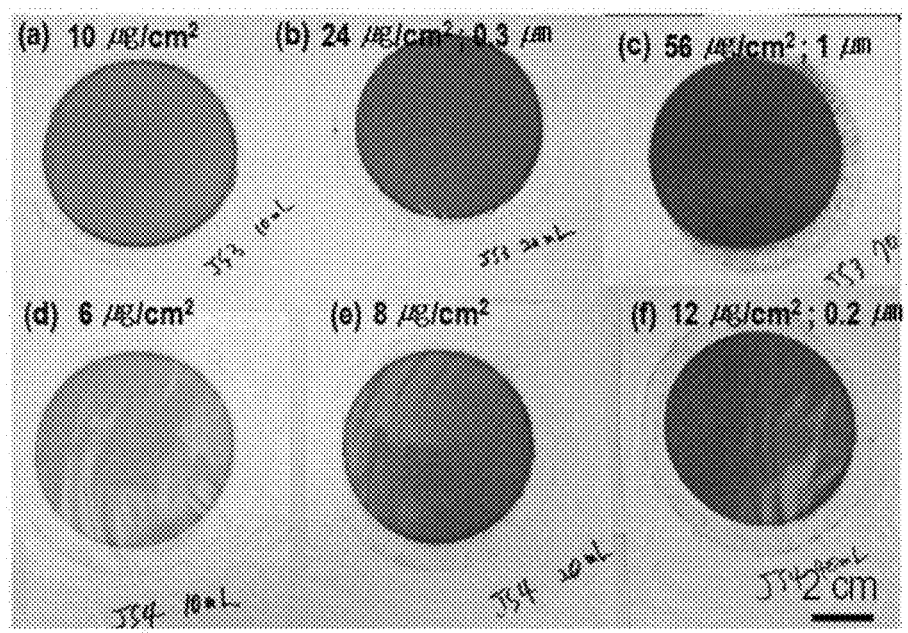

【Figure 3】
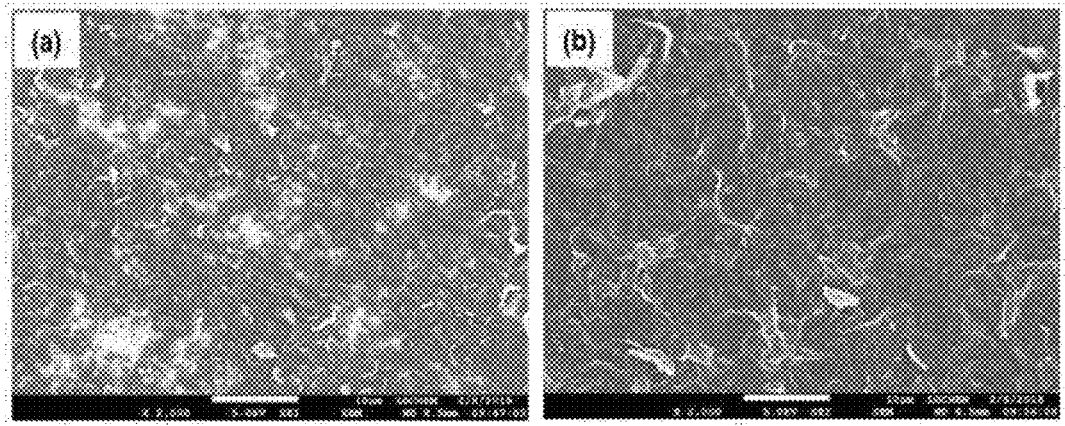
【Figure 4】
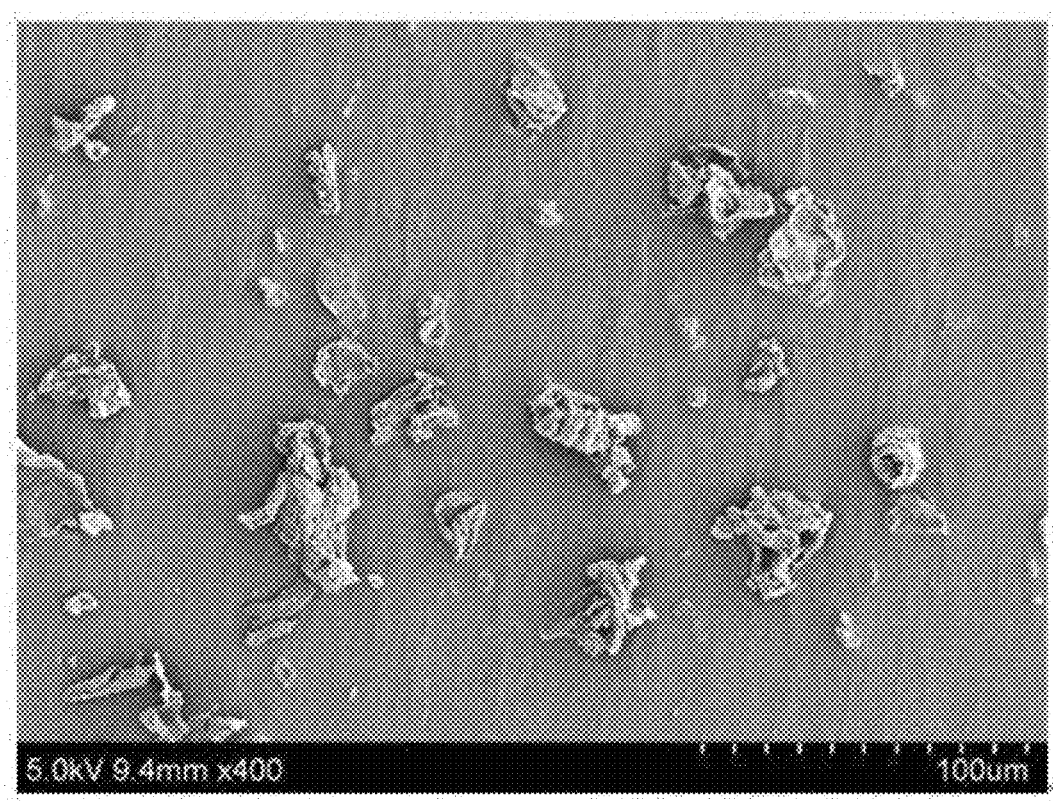

[Figure 5]
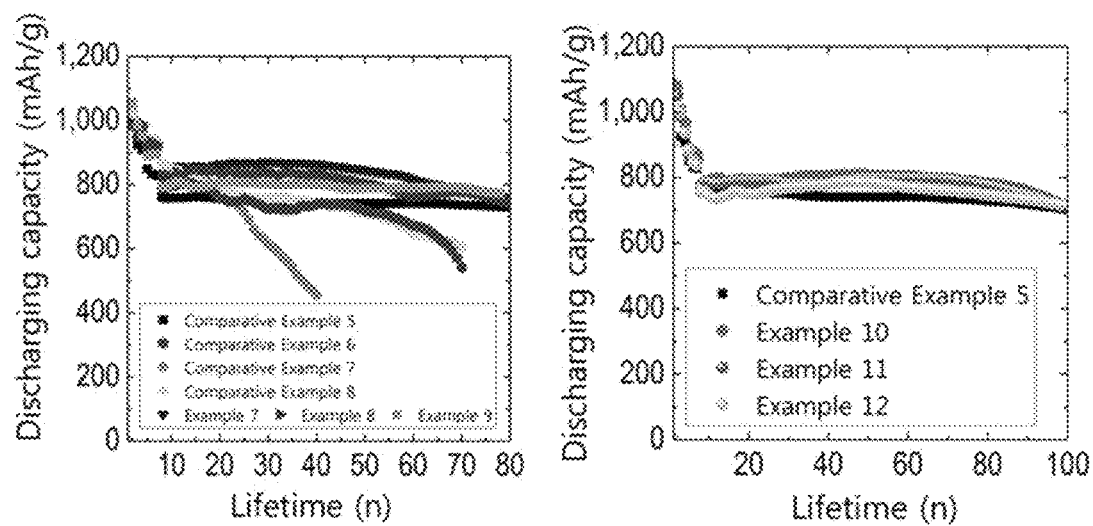

[Figure 6]
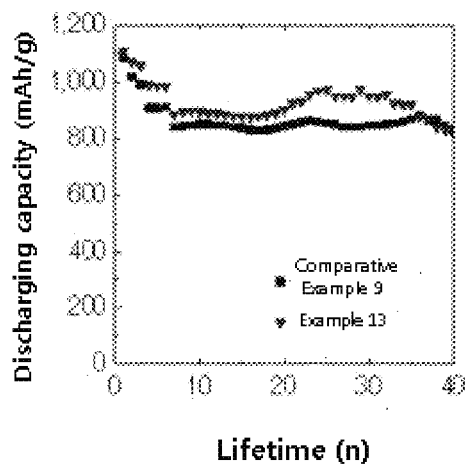
(a)
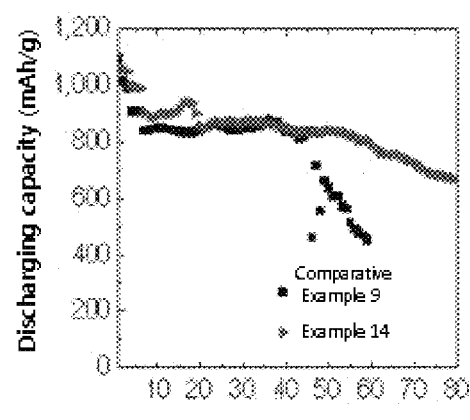
(b)
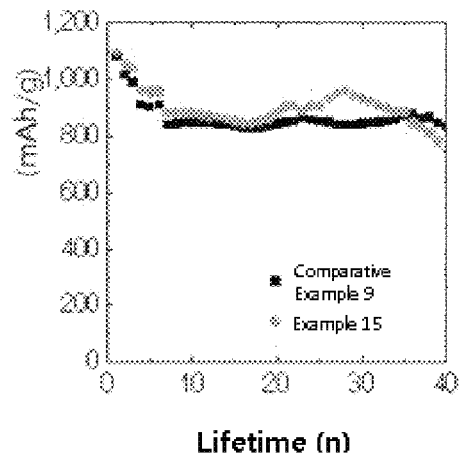
(c)

[Figure 7]
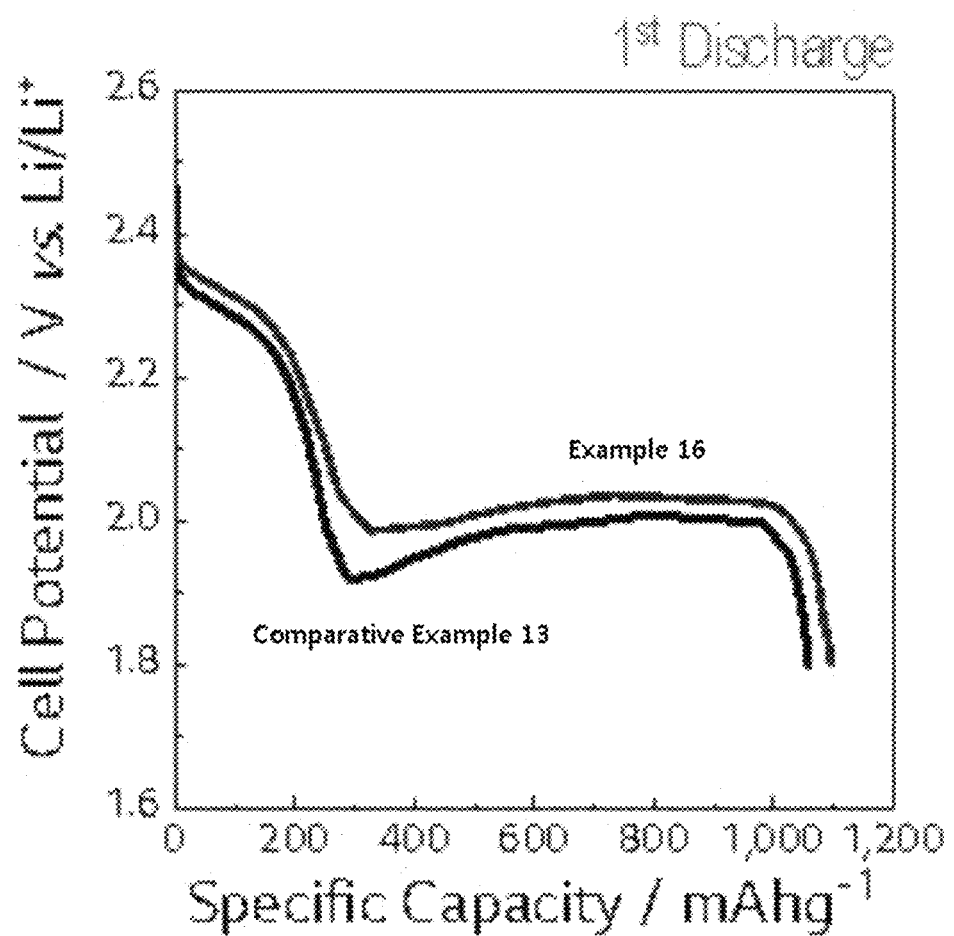

FUNCTIONAL SEPARATOR, MANUFACTURING METHOD THEREFOR, AND LITHIUM SECONDARY BATTERY COMPRISING SAME

TECHNICAL FIELD

This application claims the benefits of priorities based on Korean Patent Application No. 10-2018-0129174 filed on Oct. 26, 2018 and Korean Patent Application No. 10-2019-0132731 filed on Oct. 24, 2019, the entire contents of which are incorporated herein by reference.

The present invention relates to a functional separator, a preparation method thereof and a lithium secondary battery comprising the same, more particularly, to a functional separator capable of improving the capacity and lifetime of a battery by coating a material, which is capable of reducing lithium polysulfide, on the surface of the separator in order to resolve the problems caused by leaching of lithium polysulfide, a preparation method thereof and a lithium secondary battery comprising the same.

BACKGROUND ART

As the interest in energy storage technology is increased, and the field of application thereof has extended to the energy of mobile phones, tablets, laptops, and camcorders, and further to electric vehicles (EVs) and hybrid electric vehicles (HEVs), and thus the research and development of electrochemical devices for energy storage is steadily increasing. The electrochemical devices are the field that is receiving the most attention in this respect, and among them, the development of the secondary battery such as lithium-sulfur battery that is capable of charging/discharging has become a focus of attention. In recent years, in order to improve capacity density and specific energy in developing such a battery, research and development of the design of new electrodes and batteries have been conducted.

A lithium-sulfur battery (Li—S battery) among these electrochemical devices has high energy density (theoretical capacity), and thus is attracting attention as a next-generation secondary battery that can replace lithium ion batteries. In such a lithium-sulfur battery, a reduction reaction of sulfur and an oxidation reaction of lithium metal occur during discharging. At this time, sulfur forms linear lithium polysulfides (LiPS) from $S_8$ of the ring structure. The lithium-sulfur battery has a characteristic of indicating a stepwise discharging voltage until the polysulfide is completely reduced to $Li_2S$.

However, the biggest obstacle to the commercialization of the lithium-sulfur battery is the leaching and shuttle phenomenon of lithium polysulfide, and due to this, there is a big problem that the capacity of the lithium-sulfur battery is reduced. That is, since the polysulfide leached from the positive electrode has high solubility into the organic electrolyte solution, undesired movement (PS shuttling) toward the negative electrode through the electrolyte solution can occur, thereby resulting in a decrease in capacity due to irreversible loss of the positive electrode active material and a reduction of the lifetime of the battery due to deposition of sulfur particles on the surface of the lithium metal by side reactions. In order to solve these problems, although various studies such as addition of a PS adsorption material to a positive electrode composite or modification of a separator made of a conventional PE are being conducted, but a clear solution has not yet been proposed.

DISCLOSURE

Technical Problem

Accordingly, in order to solve the problems caused by leaching of lithium polysulfide, it is an object of the present invention to provide a functional separator capable of improving the capacity and lifetime of a battery by coating conductive carbon, which is capable of reducing lithium polysulfide, and metal oxide on the surface of the separator, a preparation method thereof, and a lithium secondary battery comprising the same.

Technical Solution

In order to achieve the above object, the present invention provides a functional separator comprising a base separator; a conductive carbon layer located on the surface of the base separator; and a metal oxide formed on at least one of the interior and the surface of the conductive carbon layer.

In addition, the present invention provides a method for preparing a functional separator comprising the steps of (a) mixing and reacting the conductive carbon and the metal oxide precursor in the presence of a solvent to prepare a carbon-metal oxide mixture; and (b) coating the prepared carbon-metal oxide mixture on the surface of the base separator.

In addition, the present invention provides a lithium secondary battery comprising a positive electrode; a negative electrode; the above functional separator interposed between the positive electrode and the negative electrode; and an electrolyte.

Advantageous Effects

The functional separator, the preparation method thereof and the lithium secondary battery comprising the same according to the present invention have an advantage of improving the capacity and lifetime of the battery by coating conductive carbon, which is capable of reducing lithium polysulfide, and metal oxide on the surface of the separator, to resolve the problems caused by the leaching of the lithium polysulfide.

DESCRIPTION OF DRAWINGS

FIG. 1 is an image of conductive carbon and metal oxide on the surface of the functional separator prepared according to the present invention observed by an electron microscope.

FIG. 2 is an image of the functional separator according to the present invention.

FIG. 3 is an image of the functional separator according to the present invention observed by an electron microscope.

FIG. 4 is an image of the conventional separator observed by a scanning electron microscope (SEM).

FIGS. 5 to 7 are graphs comparing and comparing lifetime or discharge characteristics of lithium-sulfur batteries according to examples of the present invention and comparative examples.

BEST MODE

Hereinafter, the present invention will be described in detail.

The functional separator according to the present invention comprises a base separator, a conductive carbon layer on a surface of the base separator, and a metal oxide on at least one of the interior surface of the conductive carbon layer (e.g., a first surface facing the base separator) and the surface of the conductive carbon layer (e.g., a second surface opposite the base separator).

The separator is interposed between the positive electrode and the negative electrode (i.e., a physical separator having the function of physically separating the electrodes), which enables the transport of lithium ions between the positive electrode and the negative electrode while separating or isolating the positive electrode and the negative electrode from each other. In particular, the separator is preferable as it has an excellent impregnation ability for the electrolyte while having a low resistance to ion migration of the electrolyte and being made of a porous, non-conductive or insulating material.

Meanwhile, the base separator on which the conductive carbon layer and the metal oxide are not formed may be an independent member such as a film, or a coating layer added (bonded) to any one or more of the positive electrode and negative electrode. Specifically, a porous polymer film, for example, porous polymer films made of polyolefin-based polymers such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

Next, the conductive carbon layer or conductive carbon is coated on the surface of the base separator and serves to support the inorganic material, and the conductive carbon itself has a pore structure to allow the electrolyte to freely enter and exit. In addition, the conductive carbon has a conductivity, as the name implies, and is a component capable of reducing lithium polysulfide by transferring electrons to an inorganic material (i.e., metal oxide to be described later) due to such a property.

The conductive carbon may be applied without particular limitation as long as it is a conductive carbon material capable of exhibiting the above effects. Among them, carbon nanotubes (CNT), graphene, graphene oxide, reduced graphene oxide (rGO), thermally-expanded reduced graphene oxide (TErGO) and graphite oxide are mentioned as examples, and it may be more desirable to use thermally-expanded reduced graphene oxide (TErGO), which is advantageous in exfoliation due to thermal expansion and thus allows for a thinly large area coating, thereby resulting in excellent performance.

In the preparation of graphite oxide obtained through the oxidation, reduced graphene oxide obtained by reducing the graphene oxide obtained by ultrasonic decomposition of the graphite oxide and the like, the oxidation or reduction may be carried out by methods known by those skilled in the art or by various methods modified from such methods, and are not particularly limited in the present invention. The reduction treatment may be performed by chemical reduction using a reducing agent, heat treatment reduction method, microwave reduction method, plasma reduction method, hydrogen gas exposure, and the like. In this case, the reducing agent is any one selected from the group consisting of hydrazine hydrate, potassium hydroxide, sodium borohydride, sodium hydroxide, sodium bisulfate, sodium sulfite, thionyl chloride, sulfur dioxide and ascorbic acid or mixtures of two or more thereof. For example, the heat treatment reduction method may be performed for 30 minutes to 24 hours, preferably 2 hours to 6 hours in the temperature range of 300 to 1,200° C., preferably 500 to 1,000° C. In addition, the heat treatment reduction method may be performed under any one or more gas atmosphere selected from the group consisting of methane, hydrogen, nitrogen, helium, neon, argon and mixtures thereof.

Meanwhile, the thermally-expanded reduced graphene oxide (or thermally-peeled reduced graphene oxide: TErGO) may be one obtained by thermally treating graphene oxide to produce thermally-expanded graphene oxide and then reducing it. At this time, the heat treatment for the preparation of thermally-expanded graphene oxide may be carried out by methods known by those skilled in the art or by various methods modified from such methods, and are not particularly limited in the present invention. For example, the heat treatment may be performed for 10 minutes to 3 hours in the temperature range of 300 to 900° C.

In particular, the thermally-expanded reduced graphene oxide (TErGO) is an exfoliated one, and may have a thickness of 0.5 to 40 nm, preferably 5 to 30 nm, more preferably 10 to 20 nm, and may also have a plate or flake shape. In addition, the degree of thermal expansion of the thermally-expanded reduced graphene oxide (TErGO) can vary in the range of BET from 100 $m^2/g$ to 900 $m^2/g$, and the degree of reduction can be measured through XPS or EA. In addition, the general graphene oxide has a mass ratio of carbon to oxygen of about 1:1, whereas the reduced graphene oxide may be in about 9:1.

In general, the reduced graphene oxide before exfoliation has a thickness of about 50 to 500 nm, and it not only required the use of a binder because it is easily detached when coated in the form of particles, but also had a low coating density, so that the desired effect could not be obtained sufficiently. However, in the present invention, by using a thermally-expanded reduced graphene oxide of a plate or flake shape with a range of thickness through exfoliation, it can be uniformly and densely coated on the substrate.

The conductive carbon layer may be formed on a part of the surface of the base separator, but is preferably formed on the entire surface of the base separator, in order to maximize the manifestation of the effects in accordance with the use of conductive carbon. The conductive carbon layer has a thickness of 0.01 to 10 μm, preferably 0.05 to 5 μm, more preferably 0.1 to 3 μm. If the thickness of the conductive carbon layer is less than 0.01 μm, the conductive network is not sufficiently formed, since the conductive network is not sufficiently formed, there may arise a problem that the electronic conductivity is lowered. If the thickness of the conductive carbon layer exceeds 10 μm, there is a concern that the passage of lithium ions is disturbed to increase the resistance of the cell, and also disadvantageous problems occur in terms of energy density per volume. In addition, the content of the conductive carbon layer may be 0.05 to 20 parts by weight, preferably 0.1 to 10 parts by weight, more preferably 0.5 to 6 parts by weight relative to 100 parts by weight of the total weight of the base separator to be coated.

In addition, the conductive carbon or conductive carbon layer has pores formed therein, and the porosity of the pores is 40 to 90%, preferably 60 to 80%. If the porosity of the pores is less than 40%, the delivery of lithium ions is not performed normally, thereby acting as a resistance component and thus causing a problem. If the porosity of the pores exceeds 90%, there may arise a problem that the mechanical strength is lowered. In addition, the pore size of the conductive carbon is 10 nm to 5 μm, preferably 50 nm to 5 μm. If the pore size is less than 10 nm, there may arise a problem that lithium ion is not permeable. If the pore size exceeds 5 μm, the short-circuit and safety problems may occur due to contact between electrodes.

Meanwhile, a binder may be interposed between the base separator and the conductive carbon layer to allow the conductive carbon layer to be more easily coated on the surface of the base separator. However, if the thermally-expanded reduced graphene oxide (TErGO) among the conductive carbon of the present invention, in particular, reduced graphene oxide (rGO), is used, since the conductive carbon has a plate-like structure, the conductive carbon layer can be free-standing without a binder and thus easily coated on the surface of the base separator.

Finally, the metal oxide formed on at least one of the interior and the surface of the conductive carbon layer will be described. The metal oxide is a component that is formed in the interior or on the surface of the conductive carbon layer, or both, and thus serves as a 'redox mediator' to promote the reduction of the leached lithium polysulfide. The metal oxide comprises inorganic metal particles (or inorganic particles), which are formed by bonding inorganic metal and oxygen. The inorganic metal particles may be in the nanometer size to the micrometer size. The particle diameter of the inorganic metal particles is 1 to 500 nm, preferably 5 to 100 nm, more preferably 10 to 50 nm. If the particle diameter of the inorganic metal particles is less than 1 nm, there is a concern that the inorganic particles may pass through the pores of the separator. If the particle diameter of the inorganic metal particles exceeds 500 nm, there may arise a problem that the specific surface area is reduced, thereby resulting in lower activity and increased weight, which in turn lowers the energy density of the cell. In addition, the metal oxide is not particularly limited in its morphology/shape as long as the purpose of the present invention can be achieved thereby, as may be in the form of a spot scattered on at least one of the interior and the surface of the conductive carbon layer and so on.

The inorganic metal contained in the metal oxide may be exemplified by manganese, magnesium, aluminum, cerium, iron, cobalt, vanadium, titanium, zinc, molybdenum, chromium, and the like, and manganese, which can best serve as a 'redox mediator' in the present invention, is most preferred. Thus, when the metal oxide of the present invention is also a manganese oxide, the effect may be best. Such manganese oxides may be exemplified by manganese monoxide (MnO), manganese dioxide ($MnO_2$), manganese trioxide ($MnO_3$), trimanganese tetraoxide ($Mn_3O_4$) and dimanganese trioxide ($Mn_2O_3$). Among them, it is preferable to apply manganese dioxide as a metal oxide. In addition, the content of the metal oxide is 1 to 1,000 parts by weight, preferably 5 to 100 parts by weight, more preferably 10 to 80 parts by weight relative to 100 parts by weight of the total weight of the conductive carbon layer.

Meanwhile, the total thickness of the coating formed on the base separator (i.e., the thickness including the conductive carbon layer and the metal oxide, or the thickness of the conductive carbon+particle diameter of inorganic metal particles) may be 0.01 to 10 μm, preferably 0.05 to 5 μm, more preferably 0.1 to 3 μm.

In addition, the weight of the coating formed on the base separator (i.e., the weight of the conductive carbon layer+metal oxide) may be 0.1 to 40 parts by weight, preferably 1 to 10 parts by weight relative to 100 parts by weight of the base separator, and the weight of the coating formed on the base separator (i.e., the weight of the conductive carbon layer+metal oxide) may be 1 to 300 μg/cm$^2$, preferably 5 to 100 μg/cm$^2$, regardless of the weight of the base separator.

FIG. 1 is an image of conductive carbon and metal oxide on the surface of the functional separator prepared according to the present invention observed by an electron microscope. Upon looking at the functional separator of the present invention as described above, it can be seen that the metal oxide spot is formed in the form of small dots on the surface of the conductive carbon, as shown in FIG. 1.

Next, a method for preparing a functional separator according to the present invention will be described. The method for preparing the functional separator comprises the steps of (a) mixing and reacting the conductive carbon and the metal oxide precursor in the presence of a solvent to prepare a carbon-metal oxide mixture and (b) coating the prepared carbon-metal oxide mixture on the surface of the base separator.

The solvent may be exemplified by organic solvents such as water or ethanol, acetone, IPA, THF, MC, DMF, DMSO and DMAc. It may be desirable to apply water as a solvent. In addition, the reaction in the step (a) may be carried out at room temperature to 100° C., preferably 60 to 80° C. for 4 to 24 hours, preferably 8 to 12 hours.

In addition, the coating may be performed by a dropcast, dip-coating method, blade coating method, spray coating method, meyer bar coating method, or vacuum filter.

Finally, a lithium secondary battery comprising a functional separator provided by the present invention will be described. The lithium secondary battery comprising the functional separator comprises a positive electrode, a negative electrode, the functional separator interposed between the positive electrode and the negative electrode, and an electrolyte, and may be exemplified by all lithium secondary batteries known in the art, such as a lithium-sulfur battery, a lithium air battery and a lithium metal battery, and among them, the lithium-sulfur battery is preferable. The description of the functional separator comprised in the lithium secondary battery is same as those described above, and the other positive electrode, negative electrode and electrolyte applied to the lithium secondary battery may be conventional ones used in the art, and a detailed description thereof will be described later.

Meanwhile, the present invention also provides a battery module comprising the lithium secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

Hereinafter, a description of the positive electrode, negative electrode and electrolyte applied to the lithium secondary battery according to the present invention will be additionally described.

Positive Electrode

Hereinafter, the positive electrode used in the present invention will be described. A positive electrode layer can be formed by preparing a positive electrode composition comprising a positive electrode active material, an electrically conductive material and a binder, and then directly coating the slurry prepared by diluting the composition in a predetermined solvent (dispersion medium) on a positive electrode current collector and drying it. Alternatively, the positive electrode layer may be prepared by casting the slurry on a separate supporter, and then laminating the film obtained by exfoliation from the supporter onto the positive electrode current collector. In addition, the positive electrode may be manufactured by various methods using a method well known to those skilled in the art.

The electrically conductive material not only plays a role of a path through which electrons move from the positive electrode current collector to the positive electrode active material, thereby providing electronic conductivity, but also electrically connects the electrolyte and the positive electrode active material, thereby simultaneously playing a role as a path for allowing lithium ions ($Li^+$) in the electrolyte to move to sulfur and react. Accordingly, if the amount of electrically conductive material is insufficient or it does not perform its role properly, the portion of sulfur in the electrode that does not react is increased, thereby eventually leading to the reduction of the capacity. In addition, since the high rate discharging characteristics and the charging/discharging cycle lifetime are adversely affected, an appropriate electrically-conductive material needs to be added. The content of the electrically conductive material is preferably added within a range of 0.01 to 30% by weight based on the total weight of the positive electrode composition.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum powder, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available electrically-conductive materials may comprise acetylene black series of products from Chevron Chemical Company or Denka black (Denka Singapore Private Limited), products form Gulf Oil Company, Ketjen black, EC series of products from Armak Company, products of Vulcan XC-72 from Cabot Company and Super P (products of Timcal Company).

The binder is one for attaching the positive electrode active material to the current collector well, and must be well dissolved in a solvent, and also the binder should not only allow the conductive network to be well constructed between the positive electrode active material and the electrically conductive material, but also have the impregnation property for the electrolyte. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The content of the binder may be, but is not limited to, 0.5 to 30% by weight based on the total weight of the positive electrode composition. If the content of the binder resin is less than 0.5% by weight, the physical properties of the positive electrode may be degraded, thereby resulting in the detachment of the positive electrode active material and the electrically conductive material. If the content of the binder resin exceeds 30% by weight, the ratio of the active material and the electrically conductive material in the positive electrode is relatively reduced, thereby reducing the capacity of the battery and acting as a resistive element and thus reducing efficiency.

The positive electrode composition comprising the positive electrode active material, the electrically conductive material and the binder may be diluted in a predetermined solvent and coated on a positive electrode current collector using conventional methods known in the art. First, a positive electrode current collector is prepared. The positive electrode current collector generally has a thickness of 3 to 500 μm. The positive electrode current collector is not particularly limited as long as it has high electrical conductivity without causing chemical changes in the battery. For example, stainless steel, aluminum, nickel, titanium, sintered carbon, or aluminum, or stainless steel surface-treated with carbon, nickel, titanium, silver or the like may be used. The positive electrode current collector may be formed in various forms such as film, sheet, foil, net, porous body, foam, or nonwoven fabric.

Next, a slurry formed by diluting the positive electrode composition comprising the positive electrode active material, the electrically conductive material and the binder in a solvent is applied on the positive electrode current collector. The slurry can be prepared by mixing a positive electrode composition comprising the above positive electrode active material, the electrically conductive material and the binder with a predetermined solvent. In that case, the solvent should be easy to dry and should dissolve the binder well, and most preferably, the solvent is a solvent which capable of keeping the positive electrode active material and the conductive material in a dispersed state without dissolving them. If the solvent dissolves the positive electrode active material, since the specific gravity (D=2.07) of sulfur in the slurry is high, sulfur is submerged in the slurry and thus sulfur is concentrated in the current collector during the coating process and thus there is a tendency that problems occur in the conductive network, thereby occurring problems in the operation of the battery. The solvent (dispersion medium) may be water or an organic solvent. The organic solvent may be at least one selected from the group consisting of dimethylformamide, isopropyl alcohol or acetonitrile, methanol, ethanol, and tetrahydrofuran.

Subsequently, there is no particular limitation on the method of applying the positive electrode composition in the slurry state, and for example, the method may be performed by doctor blade coating, dip coating, Gravure coating, slit die coating, spin coating, Comma coating, bar coating, reverse roll coating, screen coating, cap coating method or the like. The positive electrode composition, which has undergone such a coating process, achieves evaporation of the solvent (dispersion medium), the compactness of the coating film and the adhesion between the coating film and the current collector through the subsequent drying process. At this time, the drying is carried out according to a conventional method, which is not particularly limited.

Negative Electrode

The negative electrode may be any one capable of intercalating and deintercalating lithium ions, and can be exemplified by, for example, metal materials such as lithium metal and lithium alloy, and carbon materials such as low crystalline carbon and high crystalline carbon. The low crystalline carbon is typically soft carbon and hard carbon. The high crystalline carbon is typically natural graphite, Kish graphite, pyrolytic carbon, mesophase pitch-based carbon fiber, meso-carbon microbeads, mesophase pitches, and high-temperature calcined carbons such as petroleum or coal tar pitch derived cokes. In addition, silicon-containing alloy series or oxides such as $Li_4Ti_5O_{12}$ are well known negative electrodes.

In this case, the negative electrode may comprise a binder. The binder may be various kinds of binder polymers such as polyvinylidenefluoride (PVDF), polyvinylidene fluoride-hexafluoropropylene copolymer (PVDF-co-HFP), polyacrylonitrile, polymethylmethacrylate, styrene-butadiene rubber (SBR).

In addition, the negative electrode may optionally further comprise a current collector for supporting a negative electrode active layer comprising a negative electrode active material and a binder. The negative electrode current collector may be selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as the alloy. In addition, sintered carbon, a nonconductive polymer surface-treated with a conductive material, or a conductive polymer may be used.

The binder acts to cause negative electrode active materials to become a paste and create mutual adhesion between the active materials, adhesion between the active materials and the current collector, and buffer effect for the expansion and contraction of the active materials, etc. Specifically, the binder is the same as described above for the binder of the positive electrode. In addition, the negative electrode may be lithium metal or a lithium alloy. As a non-limiting example, the negative electrode may be a thin film of lithium metal, and an alloy of lithium with at least one metal selected from the group consisting of Na, K, Rb, Cs, Fr, Be, Mg, Ca, Sr, Ba, Ra, Al and Sn.

Electrolyte

The electrolyte solution comprises solvents and lithium salts, and may further comprise additives as necessary. As the solvent, a conventional nonaqueous solvent that serves as a medium for transferring ions involved in the electrochemical reaction of the battery may be used without particular limitation. Examples of the nonaqueous solvent may be a carbonate-based solvent, an ester-based solvent, an ether-based solvent, a ketone-based solvent, an alcohol-based solvent, an aprotic solvent and the like.

More specific examples of the carbonate-based solvent may be dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC). The ester-based solvent may be methyl acetate, ethyl acetate, n-propyl acetate, 1,1-dimethyl ethyl acetate, methyl propionate, ethyl propionate, γ-butyrolactone, decanolide, valerolactone, mevalonolactone, and carprolactone. The ether-based solvent may be diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether and the like. In addition, the ketone-based solvent may be cyclohexanone and the like, the alcohol-based solvent may be ethylalcohol, isopropylalcohol and the like, the aprotic solvent may be nitriles such as acetonitrile, amides such as dimethylformamide, dioxolanes such as 1,3-dioxolane (DOL), sulfolane and the like. Such nonaqueous solvents may be used alone or in combination of two or more thereof, the mixing ratio when two or more are mixed can be appropriately adjusted depending on the performance of the target battery, and a solvent in which 1,3-dioxolane and dimethoxyethane are mixed in a volume ratio of 1:1 can be exemplified.

Hereinafter, preferred examples are provided to help understanding of the present invention, but the following examples are only for exemplifying the present invention, and it is apparent to those skilled in the art that various changes and modifications can be made within the scope and spirit of the present invention, and such changes and modifications are within the scope of the appended claims.

Example 1: Preparation of Functional Separator

First, thermally-peeled reduced graphene oxide (TErGO), which is a conductive carbon, and $KMnO_4$ were mixed at a weight ratio of 1:0.15 in a water solvent, and then reacted at 80° C. for 12 hours, while stirring, to obtain a carbon-metal oxide mixture (coating or coating solution) carrying manganese dioxide ($MnO_2$) nanoparticles. Subsequently, the prepared carbon-metal oxide mixture was coated on the porous base separator made of polyethylene by vacuum filtration and dried to obtain a functional separator. Meanwhile, the total thickness of the coating (TErGO+$MnO_2$) at the time of coating was 0.2 μm, and the weight was 10 μg/cm².

Example 2: Preparation of Functional Separator

A functional separator was prepared in the same manner as in Example 1, except that the total thickness of the coating (TErGO+$MnO_2$) was changed to 0.3 μm and the coating weight was changed to 24 μg/cm².

Example 3: Preparation of Functional Separator

A functional separator was prepared in the same manner as in Example 1, except that the total thickness of the coating (TErGO+$MnO_2$) was changed to 1 μm and the coating weight was changed to 56 μg/cm².

Example 4: Preparation of Functional Separator

A functional separator was prepared in the same manner as in Example 1, except that the content ratio of TErGO and $KMnO_4$ is changed to 1:0.3 by weight ratio, the total thickness of the coating (TErGO+$MnO_2$) was changed to 0.1 μm and the coating weight was changed to 6 μg/cm².

Example 5: Preparation of Functional Separator

A functional separator was prepared in the same manner as in Example 4, except that the total thickness of the coating (TErGO+$MnO_2$) was changed to 0.15 μm and the coating weight was changed to 8 μg/cm².

Example 6: Preparation of Functional Separator

A functional separator was prepared in the same manner as in Example 4, except that the total thickness of the coating (TErGO+$MnO_2$) was changed to 0.2 μm and the coating weight was changed to 12 μg/cm².

Meanwhile, FIG. 2 is an image of the functional separator according to the present invention, and (a) to (f) of FIG. 2 show Examples 1 to 6, respectively. FIG. 3 is an image of the functional separator according to the present invention observed by an electron microscope, and (a) of FIG. 3 corresponds to Example 1, and (b) of FIG. 3 corresponds to Example 3. As shown in FIGS. 2 and 3, it can be seen that in the case of the functional separator according to the example of the present invention, the coating is uniformly well. In particular, from FIG. 3 where the functional separator was observed by an electron microscope, it can be seen that since the reduced graphene oxides are well exfoliated, they are evenly spread out in a plate shape without aggregation phenomenon.

Comparative Example 1: Preparation of Conventional Separator

A bare separator made of polyethylene (PE) was prepared without coating of separate conductive carbon and metal oxide.

Comparative Example 2: Preparation of Conventional Separator

A conventional separator was prepared in the same manner as in Example 1, except that the conductive carbon is changed to reduced graphene oxide (rGO) instead of thermally-peeled reduced graphene oxide (TErGO). FIG. 4 is an image of the conventional separator (i.e., a separator coated with rGO without exfoliation treatment on the surface of porous base separator made of polyethylene) observed by a scanning electron microscope (SEM). As shown in FIG. 4, the rGO was not exfoliated and formed into large lumps, which resulted in uncoated parts, and when such a separator is used, battery performance, such as an increase in discharging amount and lifetime, may be degraded.

Comparative Example 3: Preparation of Conventional Separator

A conventional separator was prepared in the same manner as in Example 1, except that hexaammonium heptamolybdate tetrahydrate (($NH_4$)$_6$$Mo_7$$O_{24}$·6$H_2$O) and thiourea ($CH_4$$N_2$S) are used instead of $KMnO_4$ to obtain a carbon-metal compound mixture (coating or coating solution) on which molybdenum disulfide ($MoS_2$) nanoparticles are supported.

Comparative Example 4: Preparation of Conventional Separator

A conventional separator was prepared in the same manner as in Example 1, except that the conductive carbon is changed to reduced graphene oxide (rGO) instead of thermally-peeled reduced graphene oxide (TErGO), and hexaammonium heptamolybdate tetrahydrate (($NH_4$)$_6$$Mo_7$$O_{24}$·6$H_2$O) and thiourea ($CH_4$$N_2$S) are used instead of $KMnO_4$ to obtain a carbon-metal compound mixture (coating or coating solution) on which molybdenum disulfide ($MoS_2$) nanoparticles are supported.

Examples 7~12 and Comparative Examples 5~8: Preparation-A of Lithium-Sulfur Battery A lithium-sulfur battery was manufactured, which comprises a separator prepared in Examples 1 to 6 and Comparative Examples 1 to 4, 70 µl of an electrolyte solution (DOL:DME (1:1), 1.0 M LiTFSI, 1 wt. % $LiNO_3$), and the remaining sulfur positive electrode and lithium negative electrode.

Examples 13~15 and Comparative Examples 9~12: Preparation-B of Lithium-Sulfur Battery A lithium-sulfur battery was manufactured, which comprises a separator prepared in Examples 1 to 3 and Comparative Examples 1 to 4, 70 µl of an electrolyte solution (DOL:DME (1:1), 1.0 M LiTFSI, 1 wt. % $LiNO_3$), and the remaining sulfur positive electrode and lithium negative electrode.

Examples 16 and Comparative Examples 13~16: Preparation-C of Lithium-Sulfur Battery A lithium-sulfur battery was manufactured, which comprises a separator prepared in Example 2 and Comparative Examples 1 to 4, 35 µl of an electrolyte solution (DOL:DME (1:1), 1.0 M LiTFSI, 1 wt. % $LiNO_3$), and the remaining sulfur positive electrode and lithium negative electrode.

Experimental Example 1: Evaluation of Discharge Capacity and Lifetime Characteristics of Lithium-Sulfur Battery While varying the electrolyte as described above, the lifetime characteristics of the lithium-sulfur batteries prepared in Examples 7-16 and Comparative Examples 5-16 were observed after performing three times at 0.1 C of the discharging current rate, three times at 0.2 C, and then setting to 0.5 C. FIGS. 5 to 7 are graphs comparing and comparing lifetime or discharge characteristics of lithium-sulfur batteries according to examples of the present invention and comparative examples. That is, first, Examples 7 to 12 and Comparative Examples 5 to 8, in which 70 µl of electrolyte solution prepared by adding 1.0 M LiTFSI to DOL:DME (1:1) and adding 1 wt. % $LiNO_3$ to it is applied are compared and contrasted (corresponding to a and b of FIG. 5), secondly, Examples 13 to 15 and Comparative Examples 9 to 12, in which 70 µl of electrolyte solution prepared by adding 1.0 M LiTFSI to DOL:DME (1:1) and adding 3 wt. % $LiNO_3$ to it is applied are compared and contrasted (corresponding to a to c of FIG. 6, Comparative Examples 10 to 12 show the same results as Comparative Example 9), and finally, Example 16 and Comparative Examples 13 to 16, in which 35 µl of electrolyte solution prepared by adding 1.0 M LiTFSI to DOL:DME (1:1) and adding 1 wt. % $LiNO_3$ to it is applied are compared and contrasted (corresponding to FIG. 7, Comparative Examples 14-16 showed the same results as Comparative Example 13). As shown in FIGS. 5 to 7, it was confirmed that when the functional separator coated with a conductive carbon and metal oxide on the surface according to the invention is applied to a lithium-sulfur battery, excellent discharge capacity and lifetime characteristics are shown regardless of the type of the electrolytes, as compared to the lithium-sulfur battery to which the conventional separator is applied.

The invention claimed is:
1. A functional separator comprising:
a base separator; and
a conductive carbon layer on a surface of the base separator;
wherein the conductive carbon layer comprises a conductive carbon and a metal oxide;
wherein the metal oxide is present in the interior of the conductive carbon layer and on a surface of the conductive carbon layer;

wherein the conductive carbon is thermally-expanded reduced graphene oxide; and wherein the metal oxide is manganese dioxide ($MnO_2$).

2. The functional separator according to claim 1, wherein a total weight of the conductive carbon layer and the metal oxide is 0.1 parts by weight to 40 parts by weight relative to 100 parts by weight of the base separator.

3. The functional separator according to claim 1, wherein no binder is present between the conductive carbon layer and the base separator.

4. The functional separator according to claim 1, wherein a content of the conductive carbon layer is 0.05 parts by weight to 20 parts by weight relative to 100 parts by weight of a total weight of the base separator.

5. The functional separator according to claim 1, wherein a content of the metal oxide is 1 parts by weight to 1,000 parts by weight relative to 100 parts by weight of a total weight of the conductive carbon layer.

6. A lithium secondary battery comprising: a positive electrode; a negative electrode; the functional separator of claim 1 interposed between the positive electrode and the negative electrode; and an electrolyte.

7. The lithium secondary battery according to claim 6, wherein the lithium secondary battery is a lithium-sulfur battery.

8. The functional separator according to claim 1, wherein the conductive carbon layer is present on an entirety of the surface of the base separator.

* * * * *